(12) United States Patent
Kagarlitsky

(10) Patent No.: US 10,552,624 B2
(45) Date of Patent: Feb. 4, 2020

(54) METHODS AND A SYSTEM FOR INOCULATING INTER-DEVICE COMMUNICATION

(71) Applicant: XATTIC, Inc., Palo Alto, CA (US)

(72) Inventor: Roman Kagarlitsky, Palo Alto, CA (US)

(73) Assignee: XATTIC, Inc., Palo Alto, CA (US)

( * ) Notice: Subject to any disclaimer, the term of this patent is extended or adjusted under 35 U.S.C. 154(b) by 62 days.

(21) Appl. No.: 15/192,722

(22) Filed: Jun. 24, 2016

(65) Prior Publication Data

US 2017/0372082 A1 Dec. 28, 2017

(51) Int. Cl.
*G06F 21/60* (2013.01)

(52) U.S. Cl.
CPC .......... *G06F 21/606* (2013.01); *G06F 21/608* (2013.01)

(58) Field of Classification Search
CPC ..................................................... G06F 21/606
USPC ........................................................... 726/26
See application file for complete search history.

(56) References Cited

U.S. PATENT DOCUMENTS

| 5,809,093 | A | 9/1998 | Cooper et al. |
| 5,983,348 | A | 11/1999 | Ji |
| 6,360,252 | B1 | 3/2002 | Rudy et al. |
| 6,947,162 | B2 | 9/2005 | Rosenberg et al. |
| 7,451,187 | B2 | 11/2008 | Malik et al. |
| 7,599,992 | B2 | 10/2009 | Nakajima |
| 7,607,171 | B1 | 10/2009 | Marsden et al. |
| 8,260,861 | B1 | 9/2012 | Bruno et al. |
| 8,462,949 | B2 | 6/2013 | Anderson et al. |
| 8,583,691 | B2 | 11/2013 | Yuan et al. |
| 8,769,258 | B2 | 7/2014 | Stewart et al. |
| RE45,326 | E | 1/2015 | Tsai |
| 2003/0229810 | A1* | 12/2003 | Bango ...................... G06F 21/56 726/24 |
| 2007/0067397 | A1 | 3/2007 | Tran |
| 2007/0067837 | A1* | 3/2007 | Schuster ............. H04L 63/0209 726/11 |

(Continued)

FOREIGN PATENT DOCUMENTS

| WO | WO 0104768 A1 * | 1/2001 | ......... G06K 9/00973 |
| WO | WO-2006012197 A2 | 2/2006 | |

(Continued)

OTHER PUBLICATIONS

"International Application Serial No. PCT/US2017/034015, International Search Report dated Aug. 7, 2017", 2 pgs.

(Continued)

*Primary Examiner* — Peter C Shaw
(74) *Attorney, Agent, or Firm* — Schwegman Lundberg & Woessner, P.A.

(57) ABSTRACT

A sending processing environment establishes a connection with a receiving processing environment for purposes of providing data during a communication session from the sending environment to the receiving environment. The communication session is monitored and the data being sent is intercepted. The data is rendered from a first format that the data was sent in into an innocuous format that is incapable of being executed on any computing device. The data in the innocuous format is then provided to the receiving environment where the data can only be viewed.

17 Claims, 4 Drawing Sheets

(56) References Cited

U.S. PATENT DOCUMENTS

| | | | |
|---|---|---|---|
| 2007/0113282 A1* | 5/2007 | Ross | G06F 21/52 726/22 |
| 2007/0255792 A1 | 11/2007 | Gronberg | |
| 2008/0010676 A1* | 1/2008 | Dosa Racz | H04L 63/029 726/11 |
| 2010/0287246 A1* | 11/2010 | Klos | H04L 29/06 709/206 |
| 2011/0173437 A1 | 7/2011 | Basir et al. | |
| 2013/0091302 A1* | 4/2013 | Roscheisen | H04N 1/00307 709/237 |
| 2013/0174267 A1* | 7/2013 | Kass | H04L 63/14 726/26 |
| 2014/0245423 A1* | 8/2014 | Lee | H04L 63/0218 726/12 |
| 2014/0280403 A1 | 9/2014 | Swansegar et al. | |
| 2015/0143362 A1* | 5/2015 | Lukacs | G06F 9/45558 718/1 |
| 2015/0271117 A1 | 9/2015 | Massand | |
| 2016/0164880 A1* | 6/2016 | Colesa | H04L 63/105 726/1 |
| 2017/0006113 A1* | 1/2017 | Singhal | H04L 67/141 |

FOREIGN PATENT DOCUMENTS

| | | |
|---|---|---|
| WO | WO-2007053638 A2 | 5/2007 |
| WO | WO-2017222721 A1 | 12/2017 |

OTHER PUBLICATIONS

"International Application Serial No. PCT/US2017/034015, Written Opinion dated Aug. 7, 2017", 5 pgs.

"Contentcatcher:Mail Technical Overview", Content Catcher, [Online]. Retrieved from the Internet: <URL: https://www.contentcatcher.com/bundles/voyantcontentcatcher/pdf/ContentCatcher.pdf>, (Updated: Dec. 15, 2015), 5 pgs.

"D3 Email Gateway", Pathfinders Software, [Online]. Retrieved from the Internet: <URL: http://www.pfinders.com/wp/products/d3-email-gateway/>, (Accessed: Oct. 20, 2016), 2 pgs.

"Invoice Email Gateway Standards", Datam, [Online]. Retrieved from the Internet: <URL: http://www.nzdf.mil.nz/downloads/pdf/public-docs/datam-invoice-email-gateway-standards-dec2012.pdf>, (Dec. 2012), 2 pgs.

"Mitigation Monday", NSA, [Online]. Retrieved from the Internet: <URL: https://web.archive.org/web/20160322111804/https://www.nsa.gov/ia/_files/factsheets/MitigationMonday.pdf>, (Mar. 2008), 8 pgs.

Steven, Malone, "Under the Hood: Our New Email Attachment Sandbox", Mimecast, [Online]. Retrieved from the Internet: <URL: https://www.mimecast.com/blog/2015/08/under-the-hood-our-new-email-attachment-sandbox/>, (Posted: Aug. 13, 2015), 5 pgs.

Strom, David, "How to bridge and secure air gap networks", ITworld, [Online]. Retrieved from the Internet: <URL: http://www.itworld.com/article/2859246/how-to-bridge-and-secure-air-gap-networks.html>, (Dec. 12, 2014), 4 pgs.

"International Application Serial No. PCT/US2017/034015, International Preliminary Report on Patentability dated Jan. 3, 2019", 7 pgs.

"International Application Serial No. PCT/US2017/034015, International Preliminary Report on Patentability dated Aug. 7, 2017", 6 pgs.

* cited by examiner

METHODS AND A SYSTEM FOR INOCULATING INTER-DEVICE COMMUNICATION

BACKGROUND

Device and network security continues to be a major concern in today's industries. In fact, most solutions to security holes are really only temporary fixes until hackers discover a way to penetrate the solutions. As a result, there is rarely a comprehensive approach to security.

Because of this fact, many industries still deploy old technology in an attempt to prevent a security breach. For example, consider financial institutions, governmental agencies, and medical agencies that still refuse to receive any confidential data over a website connection or through an email; rather, customers are still required to fax data to fax machines when sending confidential data. This is because the financial institutions and governmental agencies do not want to run the risk of a security breach in their computer systems. However, having confidential data sitting for any extended period of time in a fax tray after receipt is far from secure. Moreover, intruders can also gain access by penetrating the wire from which the fax machine receives and sends faxes.

A problem with this approach of using old technology to avoid security breaches is that many customers lack access to a fax machine and cannot send a fax. In fact, even integration of fax capabilities into computing devices has been getting phasing out in more-recent releases of computing devices and their installed software products. It is only a matter of time when the only entities relying on fax technology will be financial institutions and governmental agencies.

As a result of this situation, customers have to visit shipping and printing stores to perform the needed fax transmission. But, these entities providing fax services may not remain for long, and the entities may not have locations that are convenient for the customers to visit to perform fax transmissions.

Consequently, many customers forgo faxing altogether and arrange for a convenient time to physically visit the financial institutions or governmental agencies and provide the confidential information in person. This is also inconvenient when customers have jobs and cannot arrange for time off during which the financial institutions and governmental agencies are open (and most of these entities have limited operating hours as well). Even self-employed or unemployed individuals experience inconveniences in: locating a business that can provide a needed fax or arranging a physical visit to that business, due to a variety of factors, such as but not limited to: traffic congestion, commuting distance, prior commitments, and the like.

Yet, fax transmissions may, in some cases, provide a superior level of security, in some situations, over newer technological approaches associated with website access, emails, and texting. This is because the newer approaches are interconnected and accessible via network connections and therefore susceptible to hacking and compromise from by anonymous and remote intruders whereas the fax machine provides a hard delineation between a networked computing environment when the fax machine is not connected to the networked computing environment.

The traditional fax configuration is a completely unconnected device from an enterprise's computing network and the output of the fax is printed media. The printed media when scanned into the enterprise's computing network becomes an image of pixels that are only capable of being viewed and do not pose any risk of network security breaches because the image data is non-executable.

This is but one example where older and outdated technology may, in some situations, actually be more secure than existing and state-of-the-art technology. Other examples may exist as well, where disconnected and non-network accessible technology provides superior security to existing approaches.

Therefore, there is a need for capturing the security benefits associated with older and outdated technologies in a manner that can integrate with state-of-the-art technology to leverage the security benefits of the outdated technology while providing integration with the state-of-the-art technology.

SUMMARY

Various embodiments herein provide methods and systems for inoculating inter-device communication. In one example embodiment, a method for inoculating inter-device communication is presented.

Specifically, in one example embodiment, a communication session occurring between a secure environment and an insecure environment is intercepted. Next, data content being sent from the insecure environment to the secure environment is identified. The data content is rendered from a first format to a second format that is incapable of execution on a computing device. Finally, the data content is delivered in the second format to the secure environment.

DETAILED DESCRIPTION

Figure 1:
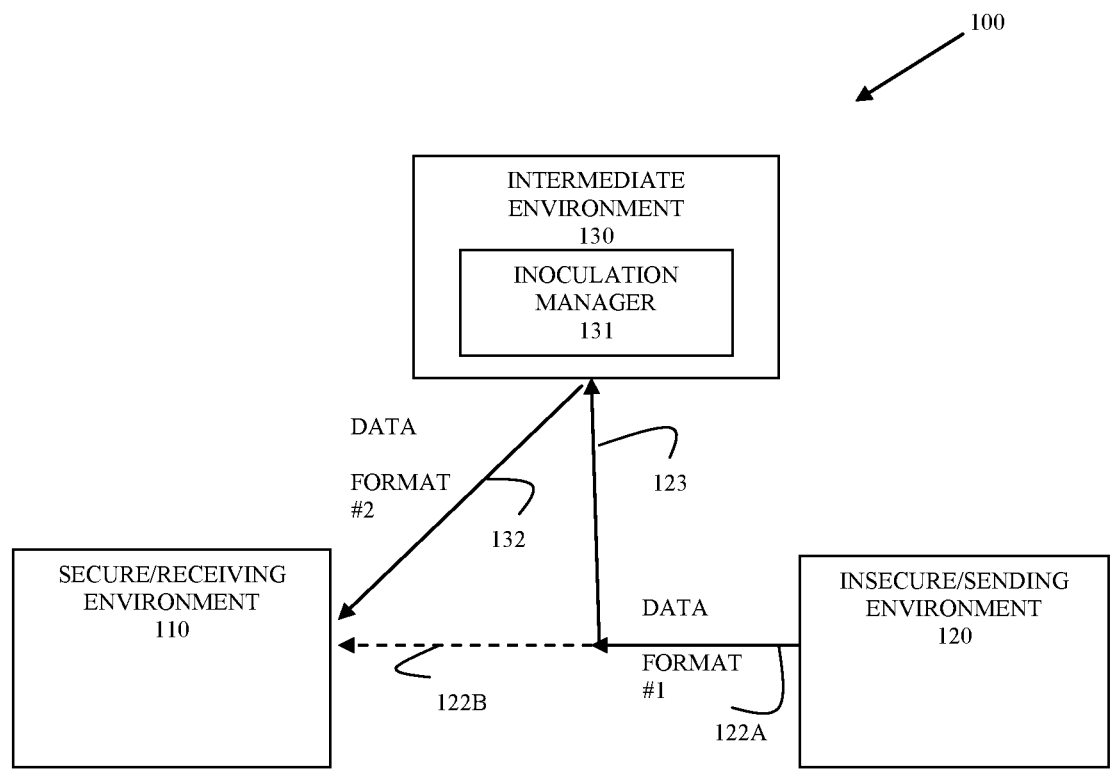
FIG. 1 is a diagram depicting an example architectural processing environment for practicing inoculation of inter-device communication, according an example embodiment.

As will be demonstrated with the teachings presented herein and below, security can be enhanced by isolation of environments and controlling formats of data being received in secure environments that were sent from insecure environments. The techniques presented allow for gaining the security benefits by leveraging old isolated technology (such as but not limited to fax technology) within existing state-of-the art technology systems, as well as providing additional security improvements over what such old isolated technologies could provide.

A "resource" includes a user, service, system, device, directory, data store, groups of users, files, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

A "processing environment" (may also be referred to as just "environment" herein and below) defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet (although they do not always have to be, as an environment can exist within a single machine and single machine can have multiple independent environments (such as multiple Virtual Machines VMs running on a single device)). So, in one case, one computing resource at network site X can be logically combined with another computing resource at network site Y to form a logical processing environment. Moreover, as stated briefly above, a processing environment can be layered on top of a hardware set of resources (hardware processors, storage, memory, etc.) as a Virtual Machine (VM) or a virtual processing environment.

The phrases "processing environment," "cloud processing environment," "hardware processing environment," "environment," and the terms "cloud" and "VM" may be used interchangeably and synonymously herein.

A "secure environment" is a relative phrase and refers to an environment that is receiving data communications from a sending environment. The sending environment is referred to herein as an insecure environment. That is, the environment receiving data communications has no way of knowing if the sending environment is secure or whether the data communications are secure; thus, the sending environment is referred to herein as an "insecure environment" and the receiving environment is referred to as the "secure environment." An original secure environment can become an insecure environment when sending data communications; similarly, an original insecure environment can become a secure environment when receiving data communications.

Moreover, and in some embodiments, an entity (through an interface) can control and dynamically designated on a per session basis or per data transaction basis what is to be designated a "secure environment" or an "insecure environment;" such that control of the processing for inoculating inter-device communication can be achieved dynamically and in a custom fashion.

The phrase "inter-device" as used herein refers to multiple processing enabled devices. For example, two separate and independent computing (processor-enabled devices) can perform inter-device communication with one another over a network connection, which can be wired or wireless (BLUETOOTH®, Near Field Communication (NFC), Radio Frequency (RF), Light based, WiFi, Sound based, and the like). As another example, the two processing enabled devices may be interfaced within a single composite device (such as a processor-enabled peripheral device that is connected via a Universal Serial Bus (USB) connection; peripheral devices can include displays, touchscreen displays, storage devices, input devices, and the like). In still another embodiment, the inter-device communication is between two Virtual Machines (VMs) that actually reside on the same physical device, such that the processing described herein is inoculating physical intra-device communications but logically inoculating inter-device communications (VM to VM).

The use of the words "intercept" and "sniff" (and these words morphological variants), as used herein, is intended to mean acquire and prevent the intended recipient of a communication from obtaining or acquiring that communication. So, when data content is intercepted or sniffed (as described herein and below) when a sending/insecure environment sends the data content to a receiving/secure environment, the receiving/secure environment never obtains and/or sees that data content in the original data format that the data content was sent in by the sending/insecure environment.

Therefore, as used herein "intercepting" and "sniffing" means: i) obtaining data content or data off a transmission wire or a port that resides on the port of a device, associated with a secure/receiving environment, and ii) preventing that obtained data content or data from being further passed along the wire (can be wireless as well) or through (off) the port to the secure/receiving environment. It is important to note that the secure/receiving environment never obtains within the secure/receiving environment the data content or data in an original sent format that was sent from an insecure/sending environment (unless as noted herein and below).

Therefore, in each of the embodiments, discussed herein and below, the secure/receiving environment is incapable of receiving data content or data being sent from an insecure/sending environment to the secure/receiving environment in an original data format that the insecure/sending environment that sent the data or data content in (except and as noted herein and below when the processing is configured to selectively permit some data content from preconfigured IP addresses and senders to deliver the data content to the secure receiving environment in an original sent data format).

Thus, the processing described, herein and below: i) intercepts that data or data content in the original sent format; ii) prevents and ensures that the secure/receiving environment does not receive the data or data content in the original sent format, iii) optically transforms the data content from the original sent format to an optical or print data format (which is incapable of execution), and iv) delivers to the secure/receiving environment the data content in the optical or print format for only viewing and/or printing within the secure/receiving environment.

Various embodiments can be implemented as enhancements within: existing network architectures, network-enabled devices, and composite devices.

Also, any software presented herein is implemented in (and reside within) hardware machines, such as hardware processor(s) or hardware processor-enabled devices (having hardware processors). These machines are configured and programmed to specifically perform the processing of the methods and system presented herein. Moreover, the methods and system are implemented and reside within a non-transitory computer-readable storage media or memory as executable instructions that are processed on the machines (processors) configured to perform the methods.

Of course, the embodiments can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1-4.

FIG. 1 is a diagram depicting an example architectural processing environment 100 for practicing inoculation of inter-device communication, according an example embodiment. It is noted that the architectural processing environment 100 is presented as an illustrated embodiment and that other component definitions are envisioned without departing from the embodiments discussed herein. It is also to be noted that only those components necessary for comprehending the embodiments are presented, such that more or less components may be used without departing from the teachings presented herein.

The architectural processing environment 100 includes: a secure/receiving environment 110, an insecure/sending environment 120, and an intermediate environment 130 having an inoculation manager 131.

Initially, two computing devices establish a communication session with one another for an insecure/sending environment 120 associated with a sending device to send data or data content to a secure/receiving environment 110 associated with a receiving device. Each device can be a variety of computing devices, such as, but not limited to: a desktop computer, a Universal Serial Bus (USB) device, a wearable processing device, a tablet, a laptop, a processing-enabled appliance, a server, and the like. In an embodiment, the sending device is a different type of device from that which is associated with the receiving device.

In an embodiment, the sending device is integrated into or connected through a USB interface (or other wired or wireless interface) as a peripheral device of the receiving device. So, the sending device and the receiving device are part of a same composite device; however, the sending device is an independent and separate device from the receiving device.

In an embodiment, the receiving device is a first VM and the sending device is a second VM. In an embodiment, the first VM and the second VM execute and are superimposed on a same underlying physical hardware device. In an embodiment, the first VM and the second VM execute and are superimposed on different underlying physical devices from one another.

In an embodiment, the receiving device is a first processing device and the sending device is a separate and independent processing device (machine to machine). The two separate machines communicating through wired, wireless, and/or a combination of wired and wireless communications with one another.

The communication session can be established using a variety of network types wired, wireless, or a combination of wired and wireless. In an embodiment, the wireless can be one of BLUETOOTH®, Low Energy BLUETOOTH® (BLE), RF, light-based, sound-based, WiFi, NFC, and others.

The intermediate environment 130 monitors connections being made and data being sent to the secure/receiving environment 110. In an embodiment, the intermediate environment 130 executes on a same device as the secure/receiving environment 110. In an embodiment, the intermediate environment 130 executes on a proxy device to the device that executes the secure/receiving environment 110. In an embodiment, the intermediate environment 130 monitors communication ports of the device that executes the secure/receiving environment 110 for activity. In an embodiment, the intermediate environment 130 wirelessly sniffs data traffic being sent to the secure/receiving environment 110.

During operation, the intermediate environment 130 detects data being sent 122A from the insecure/sending environment 120. The data is in a native format (format #1) being sent 122A from the insecure/sending environment 120 and directed to the secure/receiving environment 110 through a connection (communication session) 122B. 122B is shown as a broken line because the data in format #1 never reaches the secure/receiving environment 110 in format #1; rather, the intermediate environment 130 intercepts the data in the format #1 through 123 and passes the data in the format #1 to the inoculation manager 131.

The inoculation manager 131 converts the data in the format #1 to an innocuous data format #2, such as an image format. That is, similar to how a printer receives data in a variety of formats and renders the data to a print (type of image format), the inoculation manager 131 renders the data in the format #1 to a print or image format as the data format #2.

It is to be noted that the format #2 is incapable of being executed by a computing device; rather, the format #2 is a data viewing (image) format (view only) or data printing (print) format (print only). This ensures that when the data is received by the secure/receiving environment 110 over 132, the data is in the format #2 and is in a view only or print only format for the secure/receiving environment 110 (or any device/environment). (It is noted that this situation does not apply to the device that sends the data in the format #1, the insecure/sending environment 120, because obviously that is where the data is originating from in the format #2.)

When the inoculation manager 131 converts the data from the format #1 to the innocuous and incapable of computer execution format #2, the data in the format #1 is not stored in any permanent storage on the device that executes the inoculation manager 131. This also ensures safety and security but not maintaining data in a format (the format #1), which may infect or cause harm on the device that executes the inoculation manager 131. Moreover, as the data in the format #1 is converted to the innocuous and incapable of computer execution format (the format #2), the inoculation manager 131 wipes memory of the already converted portions of the data in the format #1, such that once the data in the format #1 is fully converted to the format #2, there is no remaining portions of the data in the format #1 in memory of the device that executes the inoculation manager 131. Again, this ensures safety of the device and provides added security.

In an embodiment, the inoculation manager 131 performs additional processing on the data in the format #2 only (the image and non-executable format). For example, the inoculation manager 131 initiates Optical Character Recognition (OCR) processing on the data in the format #2 to produce a third data format (format #3—an editable format) that is electronically capable of being edited.

In an embodiment, the inoculation manager 131 converts the data in the format #3 to an application-specific format #4 (such as word processing format, mail format, web format, etc.) for viewing and manipulation within an application (word processor, email client, browser, etc.).

It is to be noted that the format #3 and the format #4 discussed in the previous two-embodiments are derived from the image format #2 into an electronic editable format #3 and then to the application-specific format #4. At no point does the inoculation manager 131 perform OCR or conversion to an application-specific format on the data format #1 (original sent by the insecure/sending environment 120. Again, this ensures safety and security of the device processing the inoculation manager 131.

It is also to be noted that the inoculation manager 131 retains in permanent storage the data in the format #2 for purposes of subsequently being able to deliver the data in the formats #3 and/or #4 on demand to the secure/receiving environment 110.

Once the inoculation manager 131 inoculates the data in the format #1 to data in the format #2 (image or print data), the inoculation manager 131 sends the data in the format #2 over 132 to the secure/receiving environment 110.

Once the data in the format #2 is received by the secure/receiving environment 110, the data is only viewable or printable and cannot be executed on the device that processes the secure/receiving environment 110. This means that the data in the format #1 is innocuous and poses no security risk or threat to the device of the secure/receiving environment 110 or resources of the secure/receiving environment 110.

In an embodiment, the secure/receiving environment 110 (through an interface mechanism, such as an Application Programming Interface (API) or a browser-based interface) can request the data in the format #2 in the format #3 or an application-specific format (format #4) from the inoculation manager 131.

One now appreciates how security can be improved for receiving environments during communication sessions in which data or data content is being sent from sending environments. The data in the original sent format is inoculated so as to be incapable of being executed by a computing device and so as to be only capable of being viewed or printed in the receiving environments. This enhances security for externally acquired data from external device communications within the receiving environments ensuring that there is no contamination with potentially harmful data within the receiving environments.

These embodiments and other embodiments are now discussed with reference to the FIGS. 2-4.

Figure 2:
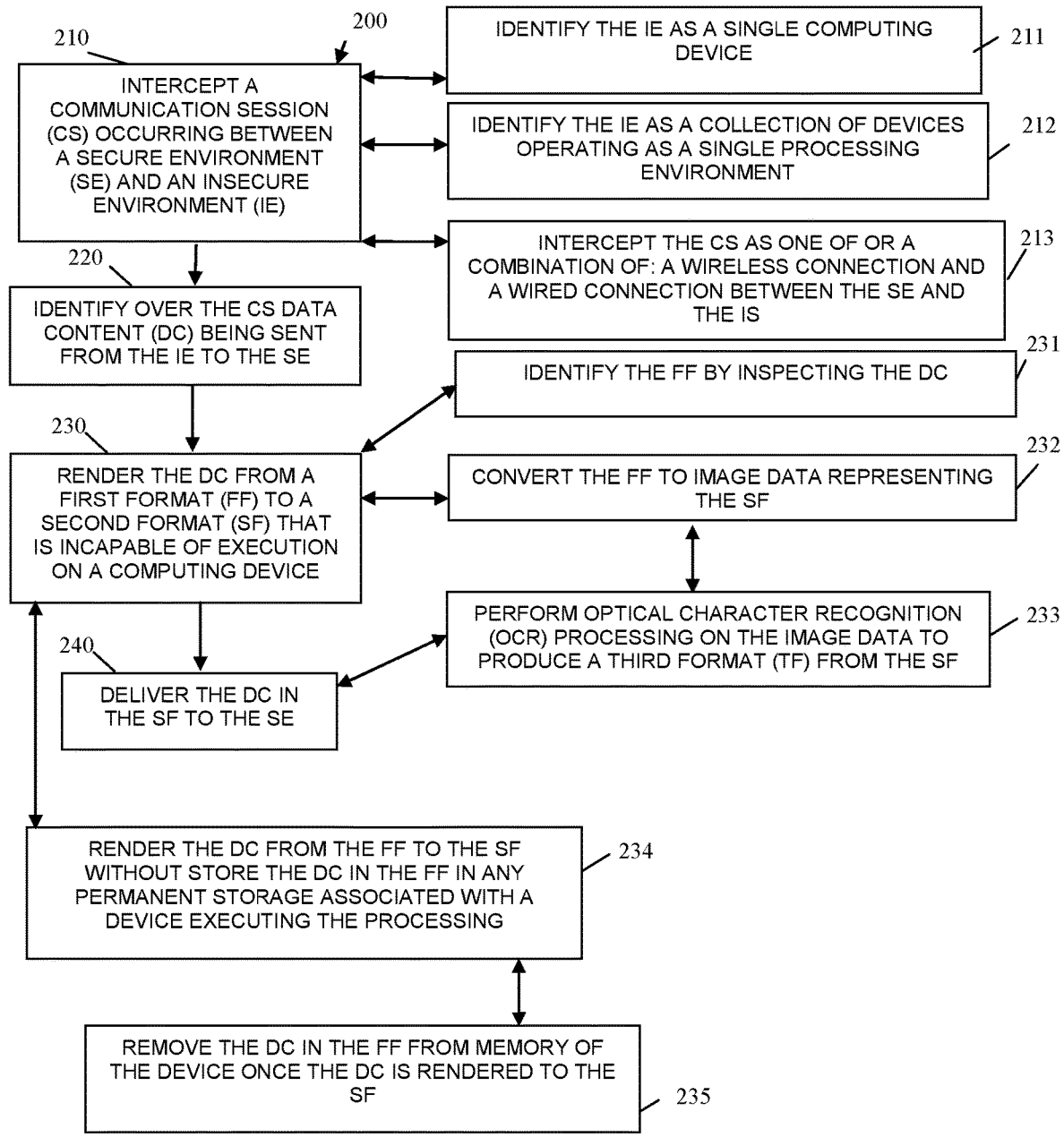
FIG. 2 is a diagram of a method for inoculating inter-device communication, according to an example embodiment.

FIG. 2 is a diagram of a method 200 for inoculating inter-device communication, according to an example embodiment. The method 200 is implemented as one or more software modules (herein after referred to as "session inoculator"). The session inoculator is represented as executable instructions that are implemented, programmed, and resides within memory and/or a non-transitory machine-readable storage media; the executable instructions execute on one or more hardware processors a device and has access to one or more network connections associated with one or more networks. The networks may be wired, wireless, or a combination of wired and wireless (as discussed above prior to the discussion of the FIG. 1).

In an embodiment, the session inoculator is the inoculation manager 131.

In an embodiment, the session inoculator processes within the intermediate environment 130.

In an embodiment, the session inoculator processes within or is a network device, such as a router/hub/switch/firewall/bridge/switch.

In an embodiment, the session inoculator processes within a cloud processing environment.

In an embodiment, the session inoculator executes on a same device that processes the intermediate environment 130.

In an embodiment, the session inoculator executes on a same motherboard as a separate independent chip on the motherboard from a chip that processes the receiving environment. Here, the chip that executes the session inoculator is connected by a bus to the chip that executes the receiving environment. The chip that executes the session inoculator may also have its own separate Operating System (OS) and connection to network interfaces of the motherboard. In this manner, the session inoculator can control input (and if desired output) being received (and if desired sent) by (or sent from) the chip executing the receiving (or sending) environment. This provides enhanced security by creating separate environments on separate chips within the motherboard for inoculating data as described herein and above. This embodiment can be deployed as an enhanced device with a dual chip motherboard for any processing-enabled device, such as a wearable processing device, a server, a laptop, a desktop computer, a tablet, a phone, and/or a processing-enabled appliance.

In an embodiment, in any of the embodiments presented herein and in particular the last-mentioned embodiment, the session inoculator may provide an interface for configuring actions of the session inoculator (with proper credentials and authentication). The interface may permit specific designated Internet Protocol (IP) addresses, resource identifiers, and the like to be exempted from the processing actions of the session inoculator (as described herein). In this way, some data content from some senders or devices (as specifically exempted through the interface) can send data content to the receiving environment in an original data format that the sending/insecure environment sends to the receiving/secure environment.

In any of the preceding environments, the session inoculator can execute as separate independent instances on both a sending device (representing a sending environment (insecure environment)) and a receiving device (representing a receiving environment (secure environment)).

At 210, the session inoculator intercepts a communication session occurring between a secure environment and an insecure environment.

In an embodiment, the secure environment is the secure/receiving environment 110.

In an embodiment, the insecure environment is the insecure/sending environment 120.

In an embodiment, the communication session is a single data transmission being sent from the insecure environment to the secure environment.

In an embodiment, the communication session is a series of data transmissions being sent from the insecure environment to the secure environment with no data being sent back from the secure environment beyond initial handshake protocol information for establishing the communication session.

In an embodiment, the communication session is a series of data transmissions being sent from the insecure environment to the secure environment and from the secure environment to the insecure environment. It is noted that when the secure environment sends a data transmission to the insecure environment, the secure environment becomes the insecure environment and the insecure environment becomes the secure environment. That is, for this embodiment the sending environment is the insecure environment and the receiving environment is the secure environment and the designations of secure and insecure environments dynamically change based on which environment is sending and which environment is receiving a data transmission during the communication session.

The session inoculator intercepts the communication session by wirelessly sniffing the communication session, by monitoring communication ports for the communication session, and/or by a proxy arrangement that redirects communications to and from the secure and insecure environments through a proxy that processes the session inoculator.

In an embodiment, at 211, the session inoculator identifies the insecure environment as a single computing device (USB device, processing-enabled appliance, server, laptop, wearable processing device, desktop computer, and the like).

In an embodiment, at 212, the session inoculator identifies the insecure environment as a collection of devices operating as a single processing environment (such as a cloud environment).

According to an embodiment, at 213, the session inoculator intercepts the communication session as one or a combination of: a wireless connection and a wired connection between the secure environment and the insecure environment. In an embodiment, the wireless connection is one of: NFC, WiFi, BLE, BLUETOOTH®, RF, cellular, satellite, light-based, and sound-based. In an embodiment, the wired connection is one of: Ethernet-based and USB-based.

At 220, the session inoculator identifies, over the communication session, data content or data being sent from the insecure environment to the secure environment. The data is not the initial handshaking protocol exchange of data to initially establish the communication session between the secure environment and the insecure environment.

At 230, the session inoculator renders the data content from a first format (native format sent from the insecure environment during the communication session to the secure environment) to a second format that is incapable of execution on any computing device.

According to an embodiment, at 231, the session inoculator identifies the first format by inspecting the data content. For example, by matching header information, encoding, and metadata associated with the data content with known formats maintained by the session inoculator, the session inoculator can properly identify the first format (native format for the data content sent from the insecure environment). If the session inoculator is unable to identify the first format or recognizes the first format as a known dangerous or malicious format, in an embodiment, the session inoculator discards and ignores the data content.

In an embodiment, at 232, the session inoculator converts the first format to image data representing the second format. Again, the session inoculator can use conversion programs similar to printer drivers to effectuate the conversion of the first format to the image data (second format). This is but one example, specific conversion utilities may also be used to convert the second format to the image format. The image format is incapable of execution on a computing device and is just capable of being viewed and/or printed to print media.

In an embodiment of 232 and at 233, the session inoculator performs OCR processing on the image data (second format and not on the first and native sent format) to produce a third format that is capable of being processed on a computing device through one or more applications executing on the computing device.

In an embodiment, at 234, the session inoculator renders the data content from the first format to the second format without storing the data content in the first format in any permanent storage associated with the device that executes the session inoculator. This provides added security by ensuring that if the data content in the first format is harmful, the data content in the first format does not remain around on the device after rendering for potential subsequent problems for the device.

In an embodiment of 234 and at 235, the session inoculator removes the data content in the first format from memory of the device once the data content or as the data content is being rendered to the second format. Again, this provides security for the device.

At 240, the session inoculator delivers the data content or data in the second (innocuous and incapable of computer execution) format to the secure environment. At this point, the data content is harmless and secure for the secure environment to view or print, since it is incapable of being executed on the device associated with the secure environment.

In an embodiment of 233 and 240, the session inoculator delivers the data content in the third format to the secure environment.

It is to be noted that the processing at 233 is one embodiment of the session inoculator, since once the secure/receiving environment receives the data content in the format that is incapable of execution, such as in an image format or print format, the secure/receiving environment may then translate or convert that harmless format to other formats through its own OCR processing, etc.

Figure 3:
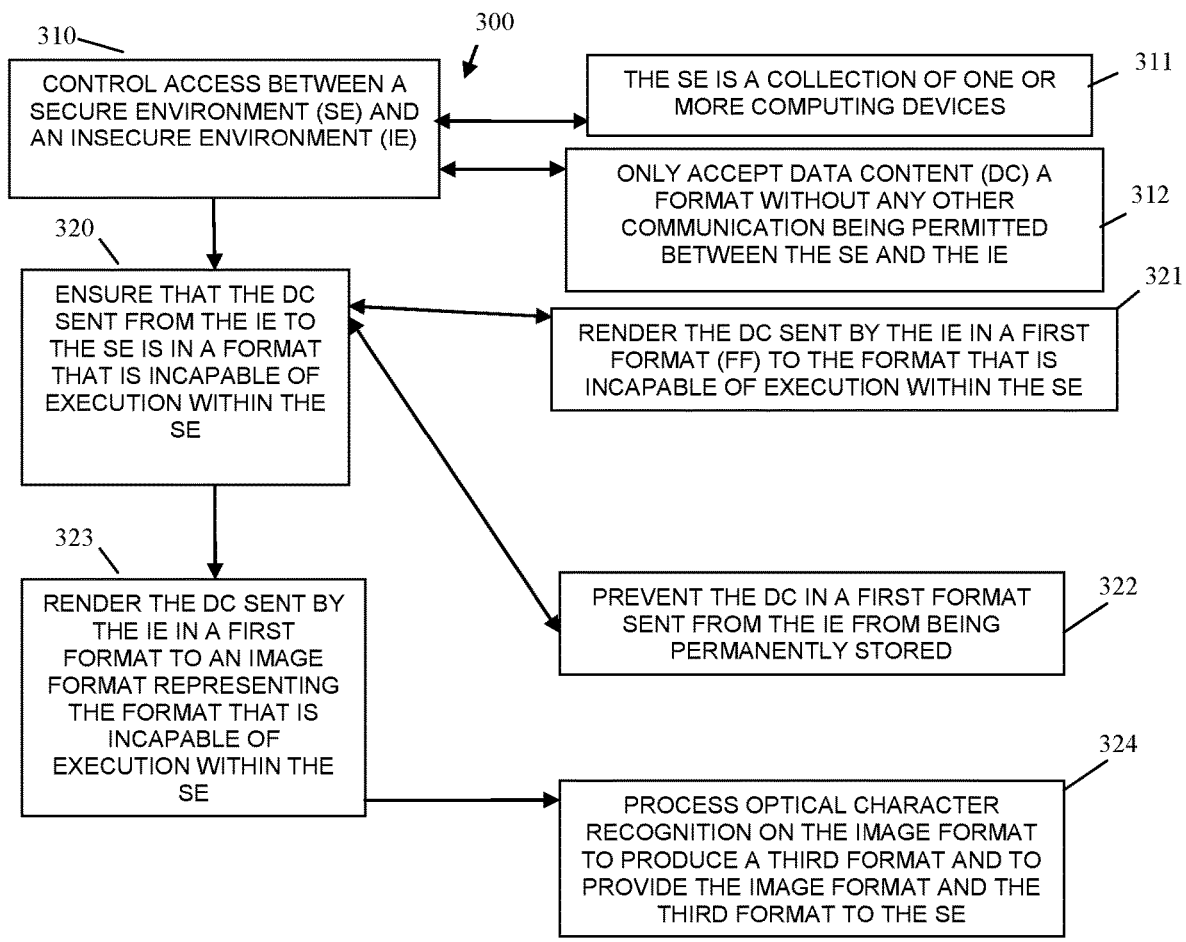
FIG. 3 is a diagram of another method for inoculating inter-device communication, according to an example embodiment.

FIG. 3 is a diagram of another method 300 for inoculating inter-device communication, according to an example embodiment. The method 300 is implemented as one or more software module(s) (herein after referred to as "connection security manager") on one or more hardware devices. The connection security manager is represented as executable instructions that are implemented, programmed, and resides within memory and/or a non-transitory machine-readable storage medium; the executable instructions execute on one or more hardware processors of a hardware device and has access to one or more network connections associated with one or more networks. The networks may be wired, wireless, or a combination of wired and wireless.

In an embodiment, the connection security manager represents another and in some cases an enhanced perspective of the session inoculator discussed above with the FIG. 2.

In an embodiment, the connection security manager is an enhanced version of the method 200.

In an embodiment, the connection security manager is the inoculation manager 131.

In an embodiment, the connection security manager processes within the intermediate environment 130.

In an embodiment, the device that is associated with the intermediate environment is the device that executes the connection security manager.

At 310, the connection security manager controls access between a secure environment and an insecure environment. That is, the connection security manager interposes itself within connections occurring between the secure environment and the insecure environment. This can be done through wireless sniffing, port monitoring, proxy redirection, and other techniques that permit the connection security manager to monitor and interject into connections between the secure and insecure environments.

In an embodiment, at 311, the insecure environment is a collection of one or more devices (such as a server or a cloud environment).

In an embodiment, at 312, the connection security manager only accepts data content in a format sent from the insecure/sending environment without any other communication being permitted between the secure environment and the insecure environment. That is, the connection is a one-way and one-time data transmission from the insecure environment to the intermediate environment (environment that executes the connection security manager). Any subsequent data transmission is ignored and not permitted to be received by the secure environment (through actions of the connection security manager).

At 320, the connection security manager ensures that data content sent from the insecure environment to the secure environment is in a format that is incapable of execution within the secure environment or any computing device(s) of the secure environment.

In an embodiment, at 321, the connection security manager renders the data content sent by the insecure environment in a first format to the format that is incapable of executing within the secure environment or any computing device that processes the secure environment.

In an embodiment, at 322, the connection security manager prevents the data content in a first format sent from the insecure environment from being permanent stored on the device or within the environment associated with the connection security manager.

In an embodiment, at 323, the connection security manager renders the data content sent by the insecure environment in a first format to an image format representing the format that is incapable of execution within the secure environment or any computing device associated with the secure environment.

In an embodiment of 323 and at 324, the connection security manager processes OCR on the image format to produce a third format for the data content and the connection security manager provides the image format and the third format to the secure environment.

Figure 4:
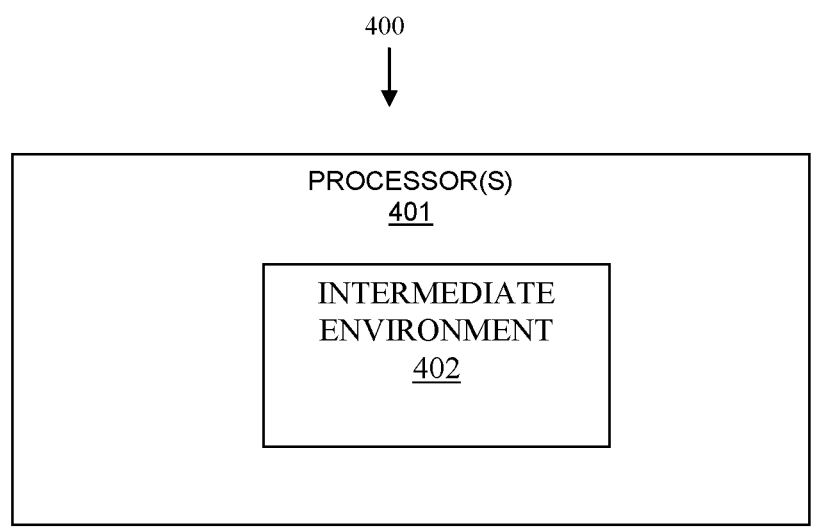
FIG. 4 is a diagram of a system for inoculating inter-device communication, according to an embodiment.

FIG. 4 is a diagram of a system 400 for inoculating inter-device communication, according to an embodiment. Various components of the system 400 are software module(s) represented as executable instructions, which are programmed and/or reside within memory and/or non-transitory computer-readable storage media for execution by one or more hardware devices. The components and the hardware devices have access to one or more network connections over one or more networks, which are wired, wireless, or a combination of wired and wireless.

In an embodiment, the system 400 implements, inter alia, the processing depicted in the FIGS. 1-3. Accordingly, embodiments discussed above with respect to the FIGS. presented herein and above are incorporated by reference herein with the discussion of the system 400.

The system 400 includes a processor(s) 401 and an intermediate environment 402.

The intermediate environment 402 is configured to: i) execute on the processor(s) 401, ii) control data content being sent from an insecure environment to a secure environment, iii) render the data content received from the insecure environment in a first data format to an image format, and iv) deliver the image format to the secure environment.

In an embodiment, the intermediate environment 402 is further configured to: v) process Optical Character Recognition (OCR) on the image format to produce a third format for the data content and deliver the data content in the third format to the secure environment upon request from the secure environment.

In an embodiment, the intermediate environment 402 is further configured to: v) prevent the data content from being permanently stored within the intermediate environment.

In an embodiment, the intermediate environment 402 is further configured to: v) remove the data content in the first data format from memory of the intermediate environment once the data content is rendered to the image format.

In an embodiment, the intermediate environment 402 is embedded on a motherboard of a device as a separate chip connected through a bus to a chip executing the receiving and/or sending environment(s), as discussed above with the description of an embodiment of the method 200.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:

intercepting a communication session occurring between a secure environment and an insecure environment, wherein intercepting further includes identifying the insecure environment as a collection of insecure environment computing devices operating as a single processing environment, and wherein intercepting further includes preventing the secure environment from obtaining any data content associated with the communication session in an original format provided by the insecure environment, and wherein the secure environment is a secure computing device that is separate from a second computing device that executes the method;

identifying over the communication session the data content being sent from the insecure environment to the secure environment;

rendering the data content from a first format to a second format that is incapable of execution on the secure computing device, wherein the second format is an image format, and wherein the first format is the original format;

delivering the data content in the second format to the secure environment; and processing the intercepting, the identifying, the rendering, and the delivering with the secure environment being designated as a new insecure environment and the insecure environment being designated as a new secure environment when the secure computing device attempts to send additional data content as a response to receipt of the data content to one of: the single insecure environment computing device and the collection of insecure environment computing devices, and dynamically designating, on a per network transaction basis, what is to be designated as the insecure environment and what is to be designated as the secure environment based on a sending environment that sends any given data being automatically designated as the insecure environment and a receiving environment that receives that given data being automatically designated as the secure environment during the communication session.

2. The method of claim 1, wherein intercepting further includes identifying the insecure environment as the single insecure environment computing device.

3. The method of claim 1, wherein intercepting further includes intercepting the communication session as one of or a combination of: a wireless connection and a wired connection between the secure environment and the insecure environment.

4. The method of claim 1, wherein rendering further includes identifying the first format by inspecting the data content.

5. The method of claim 1, wherein rendering further includes converting first format to image data representing the second format.

6. The method of claim 5, wherein converting further includes performing Optical Character Recognition (OCR) processing on the image data to produce a third format for the second data format.

7. The method of claim 1, wherein rendering further includes rendering the data content from the first format to the second format without storing the data content in the first format in any permanent storage associated with the secure computing.

8. The method of claim 7, wherein rendering further includes removing the data content in the first format from memory of the secure computing device once the data content is rendered to the second format.

9. A non-transitory computer-readable storage medium or memory having executable instructions that when executed by one or more hardware processors performs a method to:
control access between a secure environment and an insecure environment;
ensure that data content sent from the insecure environment to the secure environment is in a format that is incapable of execution within the secure environment, wherein the format is an image format;
prevent the secure environment from obtaining any of the data content in an original format provided by the insecure environment and directed to the secure environment, wherein the secure environment is executed on a first computing device that is different from the one or more hardware processors that execute the executable instructions; and
iterate the control, the ensure, and the prevent instructions with the secure environment being designated as a new insecure environment and the insecure environment being designated as a new secure environment when the first computing device sends a reply in response to receiving the data content in the image format wherein the insecure environment is identified as a collection of one or more insecure environment computing devices operating as a single processing environment; and
dynamic designate, on a per network transaction basisa what is to be designated the insecure environment and what is to be designated the secure environment based on a sending environment that sends given data being automatically designated as the insecure environment and a receiving environment that receives the given data being automatically designated as the secure environment.

10. The medium or memory of claim 9, wherein the instruction to control further include instructions to only accept the data content in the format that is incapable of execution without any other communication being permitted between the secure environment and the insecure environment.

11. The medium or memory of claim 9, wherein the instruction to control further includes instructions to render the data content sent by the insecure environment in a first format to the format that is incapable of execution within the secure environment.

12. The medium or memory of claim 9, wherein the instruction to ensure further includes instructions to prevent the data content in a first format sent from the insecure environment from being permanently stored in and environment associated with the method or the secure environment.

13. The medium or memory of claim 9, wherein instruction to ensure render further include instructions to process Optical Character Recognition (OCR) on the image formal: to produce a third format and to provide the image format and the third format to the secure environment.

14. A system, comprising:
a computing device configured to process as an intermediate environment; wherein the intermediate environment is configured to: i) control data content being sent from an insecure environment to a secure environment, wherein the insecure environment associated with a second computing device and the secure environment associated with a third computing environment ii) render the data content received from the insecure environment in a first format to an image format, iii) deliver the data content in the image format to the secure environment, iv) prevent any of the data content from being obtained by the secure environment in an of format that was provided by the insecure environment to the secure environment; and v) iterate i)-iv) with the secure environment is designated as a new insecure environment and the insecure environment is designated as a new secure environment when the third computing environment sends a reply to the second computing device responsive to receipt of the data content in the image format and wherein the insecure environment is identified as a collection of one or more insecure environment computing devices operating as a single processing environment, and dynamically designate, on a per network transaction basis, what is to be designated the insecure environment and what is to be designated the secure environment based on a sending environment that sends given data being automatically designated as the insecure environment and a receiving environment that receives that given data being automatically designated as the secure environment.

15. The system of claim 14, wherein the intermediate environment is further configured to: vi) process Optical Character Recognition (OCR) on the data content in the image format to produce that data content in a third format for the data content and deliver the data content in the third format to the secure environment upon request from the secure environment.

16. The system of claim 14, wherein the intermediate environment is further configured to: vi prevent the data content from being permanently stored within the intermediate environment in the first format.

17. The system of claim 16, wherein the intermediate environment is further configured to vii) remove the data content in the first format from memory of the intermediate environment once the data content is rendered to the image format.

* * * * *

UNITED STATES PATENT AND TRADEMARK OFFICE
CERTIFICATE OF CORRECTION

PATENT NO. : 10,552,624 B2
APPLICATION NO. : 15/192722
DATED : February 4, 2020
INVENTOR(S) : Roman Kagarlitsky It is certified that error appears in the above-identified patent and that said Letters Patent is hereby corrected as shown below:

In the Claims

In Column 13, Line 30, in Claim 9, delete "basisa" and insert --basis,-- therefor In Column 13, Line 34, in Claim 9, after "insecure", delete "¶"

In Column 13, Line 36, in Claim 9, after "automatically", delete "¶"

In Column 14, Line 3, in Claim 13, delete "formal:" and insert --format-- therefor In Column 14, Line 13, in Claim 14, after "environment", insert --,--

In Column 14, Line 18, in Claim 14, delete "of" and insert --original-- therefor In Column 14, Line 45, in Claim 16, delete "vi" and insert --vi)-- therefor In Column 14, Line 49, in Claim 17, after "to", insert --:--

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*